(12) United States Patent
Pontisakos et al.

(10) Patent No.: US 11,383,705 B2
(45) Date of Patent: Jul. 12, 2022

(54) ENHANCED COLLISION AVOIDANCE

(71) Applicant: Ford Global Technologies, LLC, Dearborn, MI (US)

(72) Inventors: Christopher Pontisakos, Allen Park, MI (US); Yuhao Liu, Canton, MI (US); Alex Maurice Miller, Canton, MI (US); Purushothaman Rayalsamy, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 16/555,471

(22) Filed: Aug. 29, 2019

(65) Prior Publication Data
US 2021/0061266 A1    Mar. 4, 2021

(51) Int. Cl.
*B60W 30/09*      (2012.01)
*B60W 30/095*     (2012.01)
*B60W 10/18*      (2012.01)
*B60W 10/20*      (2006.01)
*B60W 10/04*      (2006.01)

(52) U.S. Cl.
CPC ............ *B60W 30/09* (2013.01); *B60W 10/04* (2013.01); *B60W 10/18* (2013.01); *B60W 10/20* (2013.01); *B60W 30/0953* (2013.01); B60W 2520/14 (2013.01); B60W 2554/801 (2020.02); B60W 2554/804 (2020.02); B60W 2710/18 (2013.01); B60W 2710/20 (2013.01); B60W 2720/106 (2013.01)

(58) Field of Classification Search
CPC .. B60W 30/09; B60W 30/0953; B60W 10/18; B60W 10/20; B60W 10/04; B60W 2554/801; B60W 2554/804; B60W 2720/106; B60W 2520/14; B60W 2710/20; B60W 2710/18; B60W 2720/103; B60W 2554/4042; B60W 30/0956; B60W 40/109; B60W 50/0098; B60W 2520/125; B60W 2710/06; B60W 2710/08
See application file for complete search history.

(56) References Cited

U.S. PATENT DOCUMENTS

8,762,043 B2   6/2014   Eidehall et al.
9,827,985 B2   11/2017  Yoo et al.
(Continued)

*Primary Examiner* — Jason Holloway
(74) *Attorney, Agent, or Firm* — Frank A. MacKenzie; Bejin Bieneman PLC (57) ABSTRACT

A computer includes a processor and a memory, the memory storing instructions executable by the processor to determine at least one of: a brake threat number of a host vehicle, a brake threat number of a target vehicle, a steering threat number, or an acceleration threat number and to actuate the host vehicle to change at least one of direction or speed based on at least one of the threat numbers. The brake threat number of the host vehicle is based on a predicted lateral distance between the host vehicle and the target vehicle. The brake threat number of the target vehicle is based on a velocity of the target vehicle adjusted by an acceleration of the target vehicle and an actuation time of a brake. The steering threat number is a lateral acceleration being a predicted lateral distance adjusted by an actuation time of a steering component. The acceleration threat number is based on a predicted lateral offset adjusted by a predicted heading angle of the host vehicle.

16 Claims, 3 Drawing Sheets

(56) References Cited

U.S. PATENT DOCUMENTS

| | | | |
|---|---|---|---|
| 10,011,277 B2 | 7/2018 | Meinhart et al. | |
| 2004/0193374 A1* | 9/2004 | Hac | G08G 1/167 701/301 |
| 2008/0306666 A1* | 12/2008 | Zeng | B60Q 9/006 701/70 |
| 2009/0192710 A1* | 7/2009 | Eidehall | B60W 50/0097 701/301 |
| 2011/0178710 A1* | 7/2011 | Pilutti | B60W 30/08 701/301 |
| 2014/0067220 A1* | 3/2014 | Seiler | G06F 17/00 701/70 |
| 2016/0016561 A1* | 1/2016 | Lee | G01S 13/931 701/70 |
| 2016/0194000 A1* | 7/2016 | Taki | B60W 30/08 701/70 |
| 2017/0113665 A1* | 4/2017 | Mudalige | G08G 1/166 |
| 2018/0086351 A1* | 3/2018 | Zhu | B60W 30/16 |
| 2018/0143632 A1* | 5/2018 | Zhu | B60W 10/18 |
| 2018/0201258 A1 | 7/2018 | Luo et al. | |
| 2018/0204460 A1* | 7/2018 | Deng | G08G 1/163 |
| 2019/0096255 A1 | 3/2019 | Mills et al. | |
| 2019/0291728 A1* | 9/2019 | Shalev-Shwartz | B60T 7/22 |
| 2020/0255029 A1* | 8/2020 | Matsunaga | B60W 30/09 |

\* cited by examiner

ENHANCED COLLISION AVOIDANCE

BACKGROUND

Vehicle collisions can occur at intersections. Collision avoidance systems use sensors to detect a target that can collide with a host vehicle in the intersection. The systems can detect a target object position and speed to determine a probability of a collision with the host vehicle. Collision mitigation may be difficult and expensive to implement, e.g. assessing a target may require data from a plurality of sensors.

DETAILED DESCRIPTION

A computer includes a processor and a memory, the memory storing instructions executable by the processor to determine at least one of a brake threat number of a host vehicle, a brake threat number of a target vehicle, a steering threat number, or an acceleration threat number. The brake threat number of the host vehicle is based on a predicted lateral distance between the host vehicle and the target vehicle. The brake threat number of the target vehicle is based on a velocity of the target vehicle adjusted by an acceleration of the target vehicle and an actuation time of a brake. The steering threat number is a lateral acceleration based on a predicted lateral distance adjusted by an actuation time of a steering component. The acceleration threat number is based on a predicted lateral offset adjusted by a predicted heading angle of the host vehicle. The instructions include instructions to actuate the host vehicle to change at least one of direction or speed based on at least one of the brake threat number of the host vehicle, the brake threat number of the target vehicle, the steering threat number, or the acceleration threat number.

The instructions can further include instructions to determine the brake threat number of the host vehicle when the host vehicle is turning across a path of the target vehicle.

The instructions can further include instructions to determine the brake threat number of the target vehicle based on a brake-delayed speed that is a measure of a speed of the target vehicle adjusted by the actuation time of the brake.

The actuation time of the brake can be a time to actuate a brake pump to charge a hydraulic brake.

The instructions can further include instructions to determine the steering threat number based on a lateral acceleration to steer the host vehicle away from a path of the target vehicle in a direction opposite to a turning direction of the host vehicle.

The actuation time of the steering component can be a time to actuate a steering motor.

The instructions can further include instructions to determine the acceleration threat number based on an actuation time of a propulsion of the host vehicle to accelerate the host vehicle.

The instructions can further include instructions to set the acceleration threat number to a predetermined value when the host vehicle is not turning across a path of the target vehicle.

The instructions can further include instructions to determine the acceleration threat number when a predicted lateral position of the host vehicle exceeds a threshold.

The instructions can further include instructions to determine an overall threat number that is a minimum of the brake threat number of the host vehicle, the brake threat number of the target vehicle, the steering threat number, and the acceleration threat number.

The instructions can further include instructions to actuate the host vehicle based on the overall threat number.

When the overall threat number is the acceleration threat number, the instructions can further include instructions to actuate a propulsion to accelerate the host vehicle until the host vehicle clears a path of the target vehicle.

A method includes determining at least one of a brake threat number of a host vehicle, a brake threat number of a target vehicle, a steering threat number, or an acceleration threat number. The brake threat number of the host vehicle is based on a predicted lateral distance between the host vehicle and the target vehicle. The brake threat number of the target vehicle is based on a velocity of the target vehicle adjusted by an acceleration of the target vehicle and an actuation time of a brake. The steering threat number is a lateral acceleration based on a predicted lateral distance adjusted by an actuation time of a steering component. The acceleration threat number is based on a predicted lateral offset adjusted by a predicted heading angle of the host vehicle. The method further includes actuating the host vehicle to change at least one of direction or speed based on at least one of the brake threat number of the host vehicle, the brake threat number of the target vehicle, the steering threat number, or the acceleration threat number.

The method can further include determining the brake threat number of the host vehicle when the host vehicle is turning across a path of the target vehicle.

The method can further include determining the brake threat number of the target vehicle based on a brake-delayed speed that is a measure of a speed of the target vehicle adjusted by the actuation time of the brake.

The method can further include determining the steering threat number based on a lateral acceleration to steer the host vehicle away from a path of the target vehicle in a direction opposite to a turning direction of the host vehicle.

The method can further include determining the acceleration threat number based on an actuation time of a propulsion of the host vehicle to accelerate the host vehicle.

The method can further include setting the acceleration threat number to a predetermined value when the host vehicle is not turning across a path of the target vehicle.

The method can further include determining the acceleration threat number when a predicted lateral position of the host vehicle exceeds a threshold.

The method can further include determining an overall threat number that is a minimum of the brake threat number of the host vehicle, the brake threat number of the target vehicle, the steering threat number, and the acceleration threat number.

The method can further include actuating the host vehicle based on the overall threat number.

When the overall threat number is the acceleration threat number, the method can further include actuating a propulsion to accelerate the host vehicle until the host vehicle clears a path of the target vehicle.

A system includes a host vehicle including a brake, a steering component, means for determining at least one of: a brake threat number of a host vehicle based on a predicted lateral distance between the host vehicle and a target vehicle, a brake threat number of the target vehicle based on a velocity of the target vehicle adjusted by an acceleration of the target vehicle and an actuation time of a brake, a steering threat number that is based on a lateral acceleration being a predicted lateral distance adjusted by an actuation time of a steering component, or an acceleration threat number based on a predicted lateral offset adjusted by a predicted heading angle of the host vehicle, and means for actuating at least one of the brake or the steering component to change at least one of direction or speed based on at least one of the brake threat number of the host vehicle, the brake threat number of the target vehicle, the steering threat number, or the acceleration threat number.

The system can further include means for determining an overall threat number that is a minimum of the brake threat number of the host vehicle, the brake threat number of the target vehicle, the steering threat number, and the acceleration threat number.

The system can further include means for actuating at least one of the brake or the steering component based on the overall threat number.

The system can further include means for actuating a propulsion, vehicle when the overall threat number is the acceleration threat number, to accelerate the host vehicle until the host vehicle clears a path of the target.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

A host vehicle can determine a plurality of threat numbers based on actuation of specific components to avoid or mitigate a collision with a target vehicle. For example, the host vehicle can determine threat numbers based on an ability of the host vehicle to brake before crossing a path of the target vehicle. The host vehicle can determine the threat numbers based on respective predicted times for different points on the host vehicle to reach the path of the target vehicle. By determining multiple threat numbers based on different components, a computer in the host vehicle can actuate fewer components to avoid the collision. That is, the computer can actuate only the components required to avoid the collision with the target vehicle based on the threat numbers associated with the components.

Figure 1:
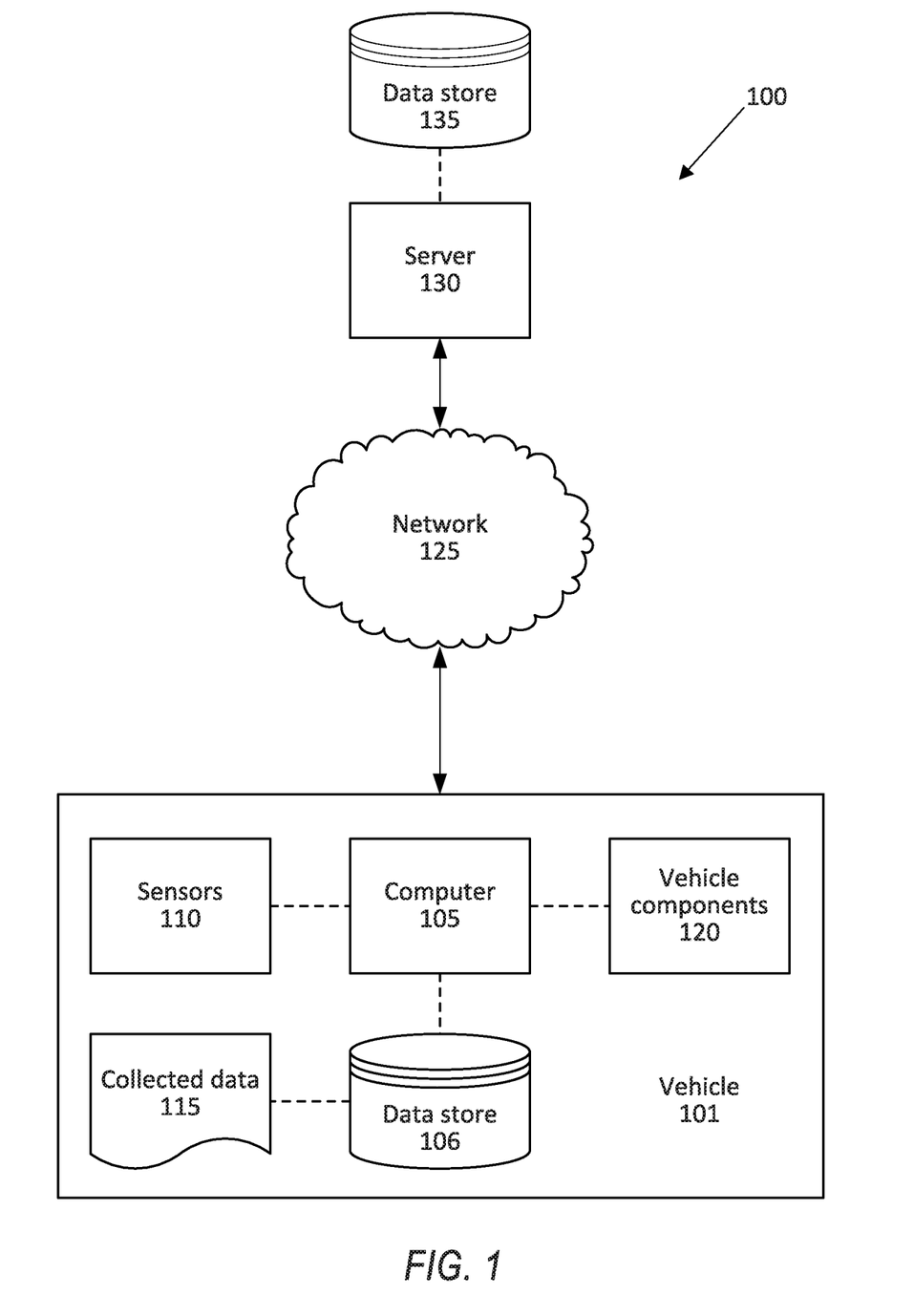
FIG. 1 is a block diagram of an example system for collision mitigation.

FIG. 1 illustrates an example system 100 for collision mitigation. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135.

The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
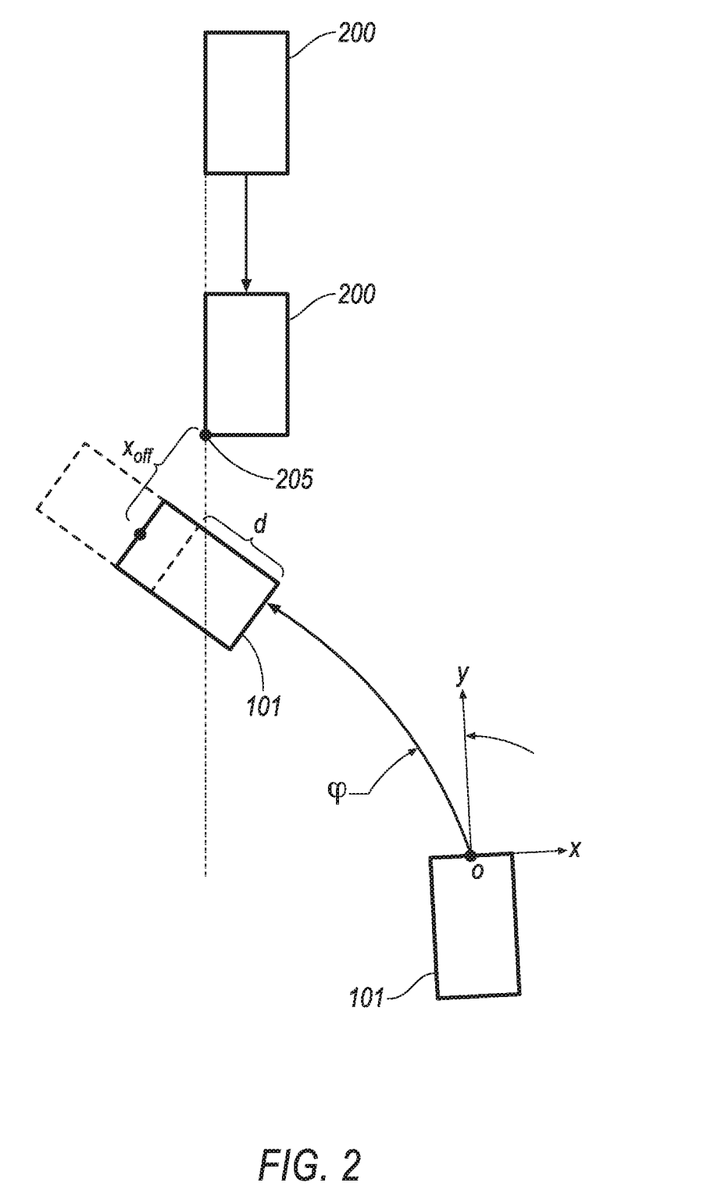
FIG. 2 is a plan view of a host vehicle and a target vehicle.

FIG. 2 is a plan view of a host vehicle 101 and a target vehicle 200 at an intersection. The host vehicle 101 defines a coordinate system, e.g., a two-dimensional rectangular coordinate system. The coordinate system defines a lateral direction x and a longitudinal direction y extending from an origin at a center point O of the host vehicle 101. The longitudinal direction y is a vehicle-forward direction, i.e., the direction in which a propulsion 120 moves the vehicle 101 when a steering component 120 is at a neutral position. The lateral direction x is perpendicular to the longitudinal direction y.

The computer 105 can determine a brake threat number $BTN_h$ for the host vehicle 101. The brake threat number $BTN_h$ is a measure of a needed longitudinal deceleration to allow the host vehicle 101 to stop before colliding with the target vehicle 200. The computer 105 determines the brake threat number $BTN_h$ based on a predicted time to collision $TTC_{long}$ between the host vehicle 101 and the target vehicle 200 and a velocity of the host vehicle 101. The time to collision $TTC_{long}$ is a measure of a time for a longitudinal distance between the host vehicle 101 and the target vehicle 200 to reach zero, i.e., for the longitudinal position of the host vehicle 101 to be substantially the same as the longitudinal position of the target vehicle 200.

The computer 105 can determine an adjusted time to collision $TTC_{adj}$ that is based on a predicted lateral distance between the host vehicle 101 and the target vehicle 200. The computer 105 can determine the adjusted time to collision $TTC_{adj}$ based on a brake threat number modification factor $BTN_{mod}$ that modifies the brake threat number $BTN_h$ based on the target vehicle speed $V_{tg}$. Values for the modification factor $BTN_{mod}$ can be determined based on empirical testing of host vehicles 101 and target vehicles 200 in collision scenarios. The modification factor $BTN_{mod}$ can be stored in a lookup table or the like in the data store 106. For example, the modification factor $BTN_{mod}$ can be values such as those shown in Table 1:

| $V_{tg}\left(\frac{m}{s}\right)$ | $BTN_{mod}$ |
|---|---|
| 0 | 0.0 |
| 13 | 0.3 |
| 30 | 0.3 |

Thus, the computer 105 can determine a modified brake threat number $BTN_h + BTN_{mod}$.

The computer 105 can determine a modified time to collision $TTC_{mod}$ based on the modified brake threat number $BTN_h + BTN_{mod}$:

$$TTC_{mod} = \frac{V_h}{(BTN_h + BTN_{mod}) \cdot a_{h,max}} \quad (1)$$

where $V_h$ is the host vehicle 101 speed and $a_{h,max}$ is a maximum deceleration of the host vehicle 101. The modified time to collision $TTC_{mod}$ represents modifications to the time to collision from the target vehicle 200 speed.

The computer 105 can predict a lateral offset $x_{off}$ between the host vehicle 101 and a corner point 205 of the target vehicle 200. The lateral offset $x_{off}$ is the predicted lateral distance between the host vehicle 101 and the target vehicle 200 at the modified time to collision $TTC_{mod}$. That is, because the modified time to collision $TTC_{mod}$ is based on a longitudinal time to collision TTC, at the longitudinal time to collision TTC, the distance between the host vehicle 101 and the target vehicle 200 is only in the lateral direction x. As an example, the computer 105 can predict the lateral offset $x_{off}$ based on a lateral and longitudinal distance determining algorithm:

$$x_{off}(T) = \frac{a_h \omega}{3} * T^3 + \frac{v_h \omega + \tilde{\ddot{x}}_{tg}}{2} * T^2 + \tilde{\dot{x}}_{tg} * T + \tilde{x}_{tg} \quad (2)$$

where T is a specified time, e.g., the modified time to collision $TTC_{mod}$, $a_h$ is the acceleration of the host vehicle 101, $v_h$ is the speed of the host vehicle 101, ω is the yaw rate of the host vehicle 101, [|$]$¨$$[|$]$¨$A\ddot{t}x_{tg}$ is the lateral acceleration of the target vehicle 200, $\dot{x}_{tg}$ is the lateral velocity of the target vehicle 200, and $\tilde{x}_{tg}$ is the lateral position of the target vehicle 200 e.g., as described in U.S. Patent Application Publication No. 2018/0204460, application Ser. No. 15/409,641, which is incorporated herein by reference in its entirety. The computer 105 can use the distance determining algorithm to determine the lateral position of the host vehicle 101 at the modified time to collision $TTC_{mod}$ to predict the lateral offset $x_{off}$.

The computer 105 can determine a brake threat number $BTN_{tg}$ for the target vehicle 200. The brake threat number $BTN_{tg}$ is a measure of the ability of the target vehicle 200 to decelerate to avoid the collision with the host vehicle 101. The brake threat number $BTN_{tg}$ can be based on a velocity of the target vehicle 200 $v_{tg}$, an acceleration of the target vehicle 200 $a_{tg}$, and an actuation time of a brake 120 $T_{BrakeDelay}$:

$$BTN_{tg} = \frac{\left(\frac{v_{tg} - a_{tg} * T_{BrakeDelay}}{TTC - T_{BrakeDelay}}\right)}{(a_{tg,max} - a_{tg})} \quad (3)$$

where $a_{tg,max}$ is the maximum deceleration of the target vehicle 200. That is, the brake threat number $BTN_{tg}$ is based on a brake-delayed speed $v_{tg} - a_{tg} * T_{BrakeDelay}$ that is a measure of a speed of the target vehicle adjusted by the actuation time $T_{BrakeDelay}$ of the brake 120. The computer 105 can determine the maximum deceleration of the target vehicle 200 $a_{tg,max}$ based on manufacturer specifications and/or empirical brake testing of vehicles 101, 200. The maximum deceleration $a_{tg,max}$ is stored in the data store 106 and/or the server 130. The time to collision TTC can be determined as described above. Alternatively, the time to collision TTC can be determined as a range divided by a range rate, i.e.

$$TTC = \frac{R}{\dot{R}},$$

where R is a range between the host vehicle 101 and the target vehicle 200 (i.e., a minimum straight-line distance between the host vehicle 101 and the target vehicle 200), $\dot{R}$ is the time-rate of change of the range.

The actuation time of the brake 120 $T_{BrakeDelay}$ is an elapsed time between when the target vehicle 200 determines to decelerate and then begins to decelerate, i.e., the actuation time of a brake of the target vehicle 200. The actuation time of the brake 120 can be substantially similar between vehicles 101, 200, so the computer 105 can use the actuation time of the brake 120 of the host vehicle 101 to determine the deceleration of the target vehicle 200. Thus, the computer 105 can determine the actuation time of the brake 120 as the elapsed time between when the computer 105 instructs the brake 120 to decelerate the host vehicle 101 and the host vehicle 101 begins to decelerate. For example, the actuation time $T_{BrakeDelay}$ can be a time for a brake pump to provide brake fluid to one or more brake pads of a hydraulic brake as specified by a manufacturer or measured from empirical testing of brakes 120 of vehicles 101, 200. The actuation time $T_{BrakeDelay}$ is stored in the data store 106 and/or the server 130.

The computer 105 can determine a steering threat number STN. The steering threat number STN is a measure of a lateral acceleration to steer the host vehicle 101 away from a path of the target vehicle 200 in a direction opposite the turning direction of the host vehicle 101. The computer 105 can determine the steering threat number STN based on a sign of the yaw rate ω of the host vehicle 101 and a sign of the predicted lateral offset $x_{off}$:

$$STN = \max\left(2 * \frac{x_{margin} + F_{sign} \cdot |x_{off}|}{(TTC_{long} - T_{SteerDelay})^2} * \frac{1}{a_{h,lat,max}}, 1\right) \quad (4)$$

where $x_{margin}$ is a lateral safety margin based on empirical testing of host vehicle 101 in intersections with target vehicles 200, $TTC_{long}$ is a longitudinal time to collision, as described above, $T_{SteerDelay}$ is an actuation time of a steering component 120, $a_{h,lat,max}$ is a maximum lateral acceleration of the host vehicle 101, and $F_{sign}$ is a factor that is either 1 or −1 depending on the signs of the yaw rate ω and the predicted lateral offset $x_{off}$:

$$F_{sign} = \begin{cases} 1 & \omega > 0, \quad x_{off} \geq 0 \\ 1 & \omega < 0, \quad x_{off} \leq 0 \\ -1 & \omega > 0, \quad x_{off} < 0 \\ -1 & \omega < 0, \quad x_{off} > 0 \end{cases} \quad (5)$$

That is, the steering threat number STN is a lateral acceleration of the host vehicle 101 based on a predicted lateral distance $x_{off}$ adjusted by an actuation time $T_{SteerDelay}$ of a steering component 120. By including for the actuation time $T_{SteerDelay}$ of the steering component 120, the computer 105 more accurately predicts the time necessary to perform steering.

The actuation time $T_{SteerDelay}$ of the steering component 120 is an elapsed time between when the computer 105 instructs the steering component 120 to steer the host vehicle 101 and the host vehicle 101 begins to turn as specified by a manufacturer and/or measured in empirical testing of steering components 120 of vehicles 101, 200. For example, the actuation time $T_{SteerDelay}$ can be a time for a steering motor to power up and move a steering rack to steer the host vehicle 101. The actuation time $T_{SteerDelay}$ is stored in the data store 106 and/or the server 130.

The computer 105 can determine an acceleration threat number ATN, e.g., as further described below. The acceleration threat number is a measure of a host vehicle 101 ability to accelerate to avoid a collision with a target vehicle 200. The acceleration threat number ATN is based on a predicted lateral offset $x_{off}$, as described above, adjusted by a predicted heading angle φ of the host vehicle 101. The computer 105 can use the acceleration threat number ATN when the host vehicle 101 is in a turn across a path of the target vehicle 200.

The computer 105 can determine an acceleration distance d that is a minimum distance in order for the host vehicle 101 to pass the target vehicle 200, as shown in FIG. 2. The acceleration distance d is based on a dimensions of the host vehicle 101, i.e., the length and width as defined above, and a predicted heading angle φ of the host vehicle 101. The heading angle φ is an angle defined between a trajectory of the host vehicle 101 and a longitudinal axis extending from a center pint of a front bumper of the host vehicle 101. The computer 105 can predict the heading angle φ at the longitudinal time to collision $TTC_{long}$ based on the yaw rate ω of the host vehicle 101:

$$\phi(TTC_{long}) = \omega \cdot TTC_{long} \quad (6)$$

The computer 105 can determine the acceleration distance d according the Equation below:

$$d = \max\left(ATN_{marg} + H_l - \left(\frac{\max\left(|x_{off}| - \frac{H_w}{2}, 0\right)}{\max(\min(\tan(\varphi), \tan(\varphi_{max})), \tan(\varphi_{min}))}\right), 0\right) \quad (7)$$

where $ATN_{marg}$ is a margin that increases the acceleration distance d based on empirical testing of host vehicles 101 and target vehicles 200 in intersections, $H_l$ is a length of the host vehicle 101 in the longitudinal direction, $H_w$ is a width of the host vehicle 101 is a lateral direction, $\varphi_{max}$ is a maximum heading angle φ, and $\varphi_{min}$ is a minimum heading angle φ. The margin $ATN_{marg}$ is a value that increases the acceleration distance d to ensure that the host vehicle 101 passes the path of the target vehicle 200. The margin $ATN_{marg}$ can be, e.g., 2 meters. The maximum heading angle $\varphi_{max}$ is a maximum heading angle φ beyond which the host vehicle 101 may be turning too quickly to accelerate away from the target vehicle 200, and the maximum heading angle $\varphi_{max}$ can be determined with empirical testing of host vehicles 101 and target vehicles 200 in intersections. The minimum heading angle $\varphi_{min}$ is a minimum heading angle φ to perform the turn, i.e., the minimum heading angle φ that can cause the host vehicle 101 to turn from a current roadway lane to a transverse roadway lane.

The computer 105 can determine the acceleration threat number ATN based on the acceleration distance d:

$$ATN = \frac{d}{a_{h,max} * (TTC_{Long} - (T_{AccelDelay} - F_{ADR} * T_{ADR}))^2} \quad (8)$$

where $a_{h,max}$ is a maximum acceleration of the host vehicle 101, $T_{AccelDelay}$ is an elapsed time between when the computer 105 instructs a propulsion 120 to accelerate the host vehicle 101 and the host vehicle 101 begins to accelerate as specified by a manufacturer or measured from empirical testing of propulsions 120 of vehicles 101, 200, $T_{ADR}$ is an acceleration reduction factor that reduces the acceleration time delay $T_{AccelDelay}$ when the host vehicle 101 is decelerating, and $F_{ADR}$ is a Boolean value that is 0 when the current acceleration $a_h$ is below or equal to a predetermined threshold and 1 when the current acceleration $a_h$ is above the predetermined threshold. For example, the acceleration delay time $T_{AccelDelay}$ can include a time for a fuel system to provide fuel to an internal combustion engine and for the engine to turn an axle of the host vehicle 101. The threshold for the Boolean value $F_{ADR}$ can be an acceleration beyond which the elapsed time between instruction of the propulsion 120 and acceleration of the host vehicle 101 is below the delay time $T_{AccelDelay}$, e.g., 1 meter/second. That is, when the host vehicle 101 is already accelerating, the elapsed time between instructing the propulsion 120 to increase the acceleration and when the host vehicle 101 accelerates may be less than when the host vehicle 101 begins acceleration from a constant speed, and the acceleration reduction factor $T_{ADR}$ is an empirically determined value based on host vehicles 101 turning across paths of target vehicles 200 that accounts for the time delay change during acceleration of the host vehicle 101. The acceleration time delay $T_{AccelDelay}$ is stored in the data store 106 and/or the server 130.

The computer 105 can determine the acceleration threat number ATN when the host vehicle 101 is turning across a path of a target vehicle 200. That is, the computer 105 can predict a path of the target vehicle 200 and, if a predicted path of the host vehicle 101 turns across the path of the target vehicle 200, the computer 105 can determine the acceleration threat number ATN. The computer 105 can predict the path of the target vehicle 200 by inputting target vehicle 200 speed, position, and acceleration from data 115 from one or more sensors to a conventional path-planning algorithm. The computer 105 can determine that the host vehicle 101 is turning across the path of the target vehicle 200 when a lateral position x of the host vehicle 101 exceeds a threshold, e.g., a width of a roadway lane.

If the computer 105 determines that the host vehicle 101 is not turning across the path of the target vehicle 200, the computer 105 can determine to set the acceleration threat number ATN to a predetermined value (e.g., 1) instead of calculating the acceleration threat number ATN according to the Equations above. That is, the computer 105 can reduce the computations performed by reducing the number of threat numbers to determine based on the predicted paths of the host vehicle 101 and the target vehicle 200, only determining the acceleration threat number ATN when the host vehicle 101 is turning across the path of the target vehicle 200.

The computer 105 can determine an overall threat number TN. The overall threat number TN is the minimum of the brake threat number of the host vehicle $BTN_h$, the brake threat number of the target vehicle $BTN_{tg}$, the steering threat number STN, and the acceleration threat number ATN. That is, lower threat numbers indicate less actuation of components 120 to avoid the target vehicle 200. For example, if the brake threat number $BTN_h$ is less than the steering threat number STN, the computer 105 can actuate the brake 120 to provide braking force that is less than the steering force required by the steering component 120 to steer the host vehicle 101 away from the target vehicle 200. That is, the computer 105 advantageously performs fewer actuations of components 120 to provide the same collision avoidance according to the minimum threat number TN.

Figure 3:
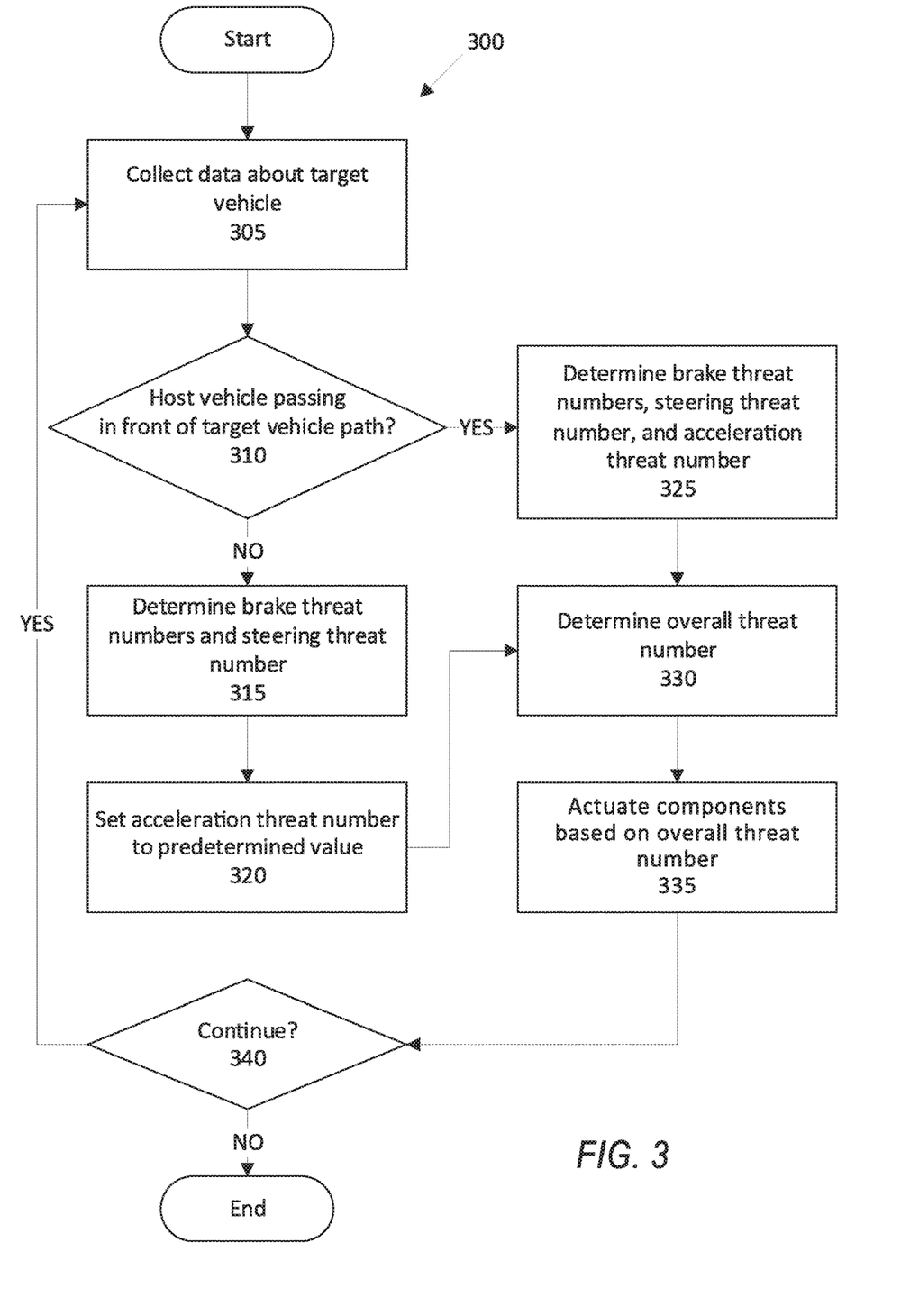
FIG. 3 is a block diagram of an example process for collision mitigation.

FIG. 3 is a block diagram of an example process 300 for collision mitigation. The process 300 begins in a block 305, in which a computer 105 of a host vehicle 101 actuates one or more sensors 110 to collect data 115 about a target vehicle 200. The computer 105 can actuate, e.g., a camera 110 to collect image data 115, a radar 110 to collect radar data 115, etc.

Next, in a block 310, the computer 105 determines whether the host vehicle 101 is passing in front of a path of the target vehicle 200. As described above, the computer 105 can predict a path of the host vehicle 101 and a path of the target vehicle 200. When the path of the host vehicle 101 turns across a path of the target vehicle 200, the computer 105 can perform threat assessments with specific threat numbers. If the host vehicle 101 is passing in front of the path of the target vehicle 200, the process 300 continues in a block 325. Otherwise, the process 300 continues in a block 315.

In the block 315, the computer 105 determines brake threat numbers $BTN_h$, $BTN_{tg}$ and a steering threat number STN. The brake threat numbers $BTN_h$, $BTN_{tg}$, as described above, are a measure of an ability for the host vehicle 101 and the target vehicle 200 to brake prior to a potential collision. The steering threat number STN, as described above, is a measure of an acceleration for the host vehicle 101 to turn away from the target vehicle 200 is a direction opposite to a turn direction of the host vehicle 101. The computer 105 determines the threat numbers $BTN_h$, $BTN_{tg}$, STN based on the collected data 115 about the target vehicle 200.

Next, in a block 320, the computer 105 sets an acceleration threat number ATN to a predetermined value. Because the host vehicle 101 is not turning across the path of the target vehicle 200, the acceleration threat number ATN may not be needed, and the computer 105 sets the acceleration threat number ATN to a value to prevent further collision mitigation and avoidance based on the acceleration threat number ATN. For example, the computer 105 can set the acceleration threat number ATN to 1.

In the block 325, the computer 105 determines brake threat numbers $BTN_h$, $BTN_{tg}$, the steering threat number STN, and the acceleration threat number ATN. As described above, the acceleration threat number ATN is a measure of an acceleration required to move the host vehicle 101 past the path of the target vehicle 200. Because the host vehicle 101 is turning across the path of the target vehicle 200, the computer 105 can determine all four threat numbers $BTN_h$, $BTN_{tg}$, STN, ATN.

Next, in a block 330, the computer 105 determines an overall threat number TN. As described above, the overall threat number TN is the minimum of the threat numbers $BTN_h$, $BTN_{tg}$, STN, ATN. By taking the minimum of the threat numbers as the overall threat number TN, the computer 105 can perform collision mitigation and avoidance with fewer components 120 to avoid the target vehicle 200, as described above.

Next, in a block 335, the computer 105 actuates one or more components 120 according to the overall threat number TN. For example, if the overall threat number TN is the steering threat number STN, the computer 105 can actuate a steering motor 120 to provide the lateral acceleration to steer the host vehicle 101 away from the target vehicle 200. In another example, if the overall threat number TN is the acceleration threat number ATN, the computer 105 can actuate a propulsion to accelerate the host vehicle 101 past the target vehicle 200. In another example, if the overall threat number is the brake threat number BTN$_h$ of the host vehicle 101, the computer 105 can actuate a brake to slow or stop the host vehicle 101 until the target vehicle 200 passes the host vehicle 101.

Next, in a block 340, the computer 105 determines whether to continue the process 300. For example, the computer 105 can determine to continue the process 300 upon approaching another intersection. If the computer 105 determines to continue, the process 300 returns to the block 305. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   determine an acceleration threat number of a host vehicle based on whether the host vehicle is turning across a path of a target vehicle, wherein:
      when the host vehicle is turning across the path of the target vehicle, the acceleration threat number is determined based on a predicted lateral offset of the host vehicle relative to the target vehicle adjusted by a predicted heading angle of the host vehicle; and
      when the host vehicle is not turning across the path of the target vehicle, the acceleration threat number is set to a predetermined value;
   determine an overall threat number of the host vehicle based on the acceleration threat number; and
   actuate the host vehicle to change at least one of direction or speed based on the overall threat number.

2. The system of claim 1, wherein the instructions further include instructions to:
   determine a brake threat number of the host vehicle based on a predicted lateral distance between the host vehicle and the target vehicle;
   determine a brake threat number of the target vehicle based on a velocity of the target vehicle adjusted by an acceleration of the target vehicle and an actuation time of a brake;
   determine a steering threat number that is a lateral acceleration based on a predicted lateral distance adjusted by an actuation time of a steering component; and
   determine the overall threat number based on the acceleration threat number, the brake threat number of the host vehicle, the brake threat number of the target vehicle, and the steering threat number.

3. The system of claim 2, wherein the instructions further include instructions to determine the brake threat number of the target vehicle based on a brake-delayed speed that is a measure of a speed of the target vehicle adjusted by the actuation time of the brake.

4. The system of claim 3, wherein the actuation time of the brake is a time to actuate a brake pump to charge a hydraulic brake.

5. The system of claim 2, wherein the instructions further include instructions to determine the steering threat number based on a lateral acceleration to steer the host vehicle away from a path of the target vehicle in a direction opposite to a turning direction of the host vehicle.

6. The system of claim 5, wherein the actuation time of the steering component is a time to actuate a steering motor.

7. The system of claim 1, wherein the instructions further include instructions to determine the acceleration threat number based on an actuation time of a propulsion of the host vehicle to accelerate the host vehicle.

8. The system of claim 1, wherein the instructions further include instructions to determine the acceleration threat number when a predicted lateral position of the host vehicle exceeds a threshold.

9. The system of claim 2, wherein the instructions further include instructions to determine the overall threat number as a minimum of the brake threat number of the host vehicle, the brake threat number of the target vehicle, the steering threat number, and the acceleration threat number.

10. The system of claim 9, wherein, when the overall threat number is the acceleration threat number, the instructions further include instructions to actuate a propulsion to accelerate the host vehicle until the host vehicle clears a path of the target vehicle.

11. A method, comprising:
determining a brake threat number of a host vehicle based on a predicted lateral distance between the host vehicle and a target vehicle;
determining a brake threat number of the target vehicle based on a velocity of the target vehicle adjusted by an acceleration of the target vehicle and an actuation time of a brake;
determining a steering threat number that is based on a lateral acceleration being a predicted lateral distance adjusted by an actuation time of a steering component;
determining an acceleration threat number of the host vehicle based on whether the host vehicle is turning across a path of the target vehicle, wherein:
when the host vehicle is turning across the path of the target vehicle, the acceleration threat number is determined based on a predicted lateral offset of the host vehicle relative to the target vehicle adjusted by a predicted heading angle of the host vehicle; and
when the host vehicle is not turning across the path of the target vehicle, the acceleration threat number is set to a predetermined value;
determining an overall threat number of the host vehicle based on the acceleration threat number, the brake threat number of the host vehicle, the brake threat number of the target vehicle, and the steering threat number; and
actuating the host vehicle to change at least one of direction or speed based on the overall threat number.

12. The method of claim 11, further comprising determining the overall threat number as a minimum of the brake threat number of the host vehicle, the brake threat number of the target vehicle, the steering threat number, and the acceleration threat number.

13. The method of claim 12, wherein, when the overall threat number is the acceleration threat number, the method further includes actuating a propulsion to accelerate the host vehicle until the host vehicle clears a path of the target vehicle.

14. A system, comprising:
a host vehicle including a brake and a steering component;
means for determining an acceleration threat number of a host vehicle based on whether the host vehicle is turning across a path of a target vehicle, wherein:
when the host vehicle is turning across the path of the target vehicle, the acceleration threat number is determined based on a predicted lateral offset of the host vehicle relative to the target vehicle adjusted by a predicted heading angle of the host vehicle; and
when the host vehicle is not turning across the path of the target vehicle, the acceleration threat number is set to a predetermined value;
means for determining an overall threat number of the host vehicle based on the acceleration threat number; and
means for actuating at least one of the brake or the steering component to change at least one of direction or speed based on the overall threat number.

15. The system of claim 14, further comprising means for determining the overall threat number as a minimum of the brake threat number of the host vehicle, the brake threat number of the target vehicle, the steering threat number, and the acceleration threat number.

16. The system of claim 15, further comprising means for actuating a propulsion when the overall threat number is the acceleration threat number, to accelerate the host vehicle until the host vehicle clears a path of the target.

* * * * *